Jan. 26, 1932.  E. E. REDDEN  1,842,799
FILLER FOR TIRES
Filed May 14, 1930  2 Sheets-Sheet 1

INVENTOR,
Eugene E. Redden,
BY
Harry W. Bowen.
ATTORNEY.

Jan. 26, 1932.  E. E. REDDEN  1,842,799
FILLER FOR TIRES
Filed May 14, 1930  2 Sheets-Sheet 2
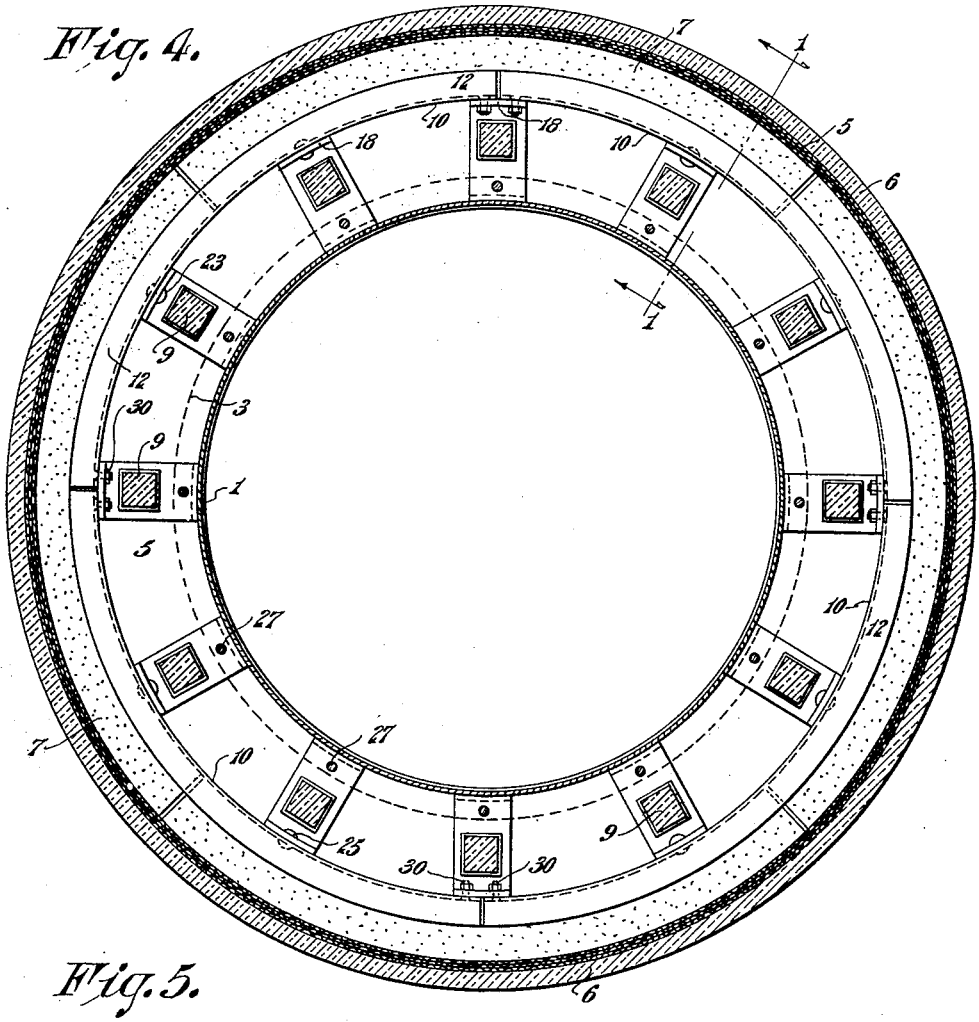
INVENTOR,
Eugene E. Redden,
BY
Harry W. Bowen.
ATTORNEY.

Patented Jan. 26, 1932

1,842,799

UNITED STATES PATENT OFFICE

EUGENE E. REDDEN, OF SPRINGFIELD, MASSACHUSETTS

FILLER FOR TIRES

Application filed May 14, 1930. Serial No. 452,438.

This invention relates to improvements in a filler construction for tires and more particularly to a filler that is designed to be located within the carcass of a pneumatic tire for the purpose of strengthening the walls thereof.

An object of the present invention is to utilize pneumatic tires, the tread portions of which have been worn practically down to the fabric. Such tires are to be reinforced or strengthened so that the life of the same may be materially increased, by means of the insertable filler. This is accomplished by inserting within the carcass of the tire radial and lateral elastic supports, which supports are preferably of a cushion nature, as rubber.

A further object is to do away, or wholly eliminate, the usual inner tube, which tube, when the tire has become weakened from wear is always in possible danger of a blow-out and injuring the inner tube, as well as the tire itself.

The present invention, therefore, entirely eliminates the use of the inner tube from a worn tire and permits the same tire to be reinforced several times, if desired, thus materially lessening the cost to the owner, as one set of tires may be repeatedly retreaded and used again, after becoming worn practically down to the fabric.

Further objects and nature of the invention will be set forth in detail in the body of the description and particularly pointed out in the appended claims.

Referring to the drawings:

Fig. 4 is a vertical sectional view on the line 4—4 of Fig. 1 showing a plurality of sector members which are secured together and to which members the brackets are attached, and Fig. 5 is a detail view of the means for connecting the channel-shaped members together.

Figure 1:
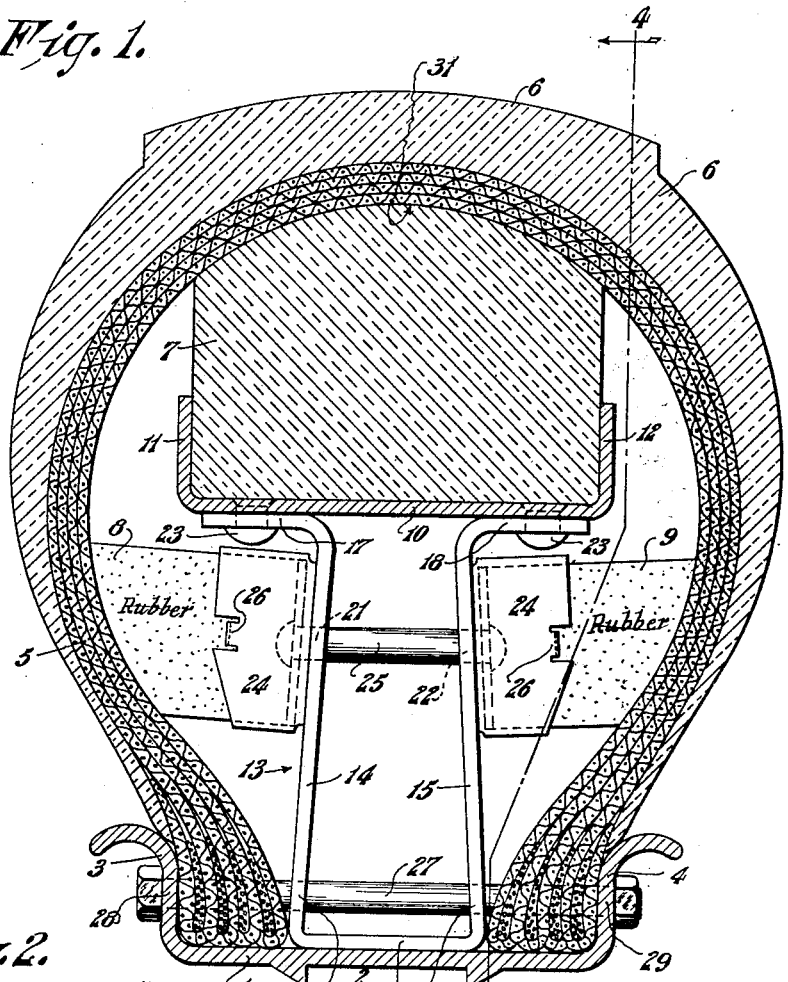
Fig. 1 is a transverse sectional view on the line 1—1 of Fig. 4 thru the tire and filler, showing the filler construction and the means for securing the filler construction to the rim.
Figure 2:
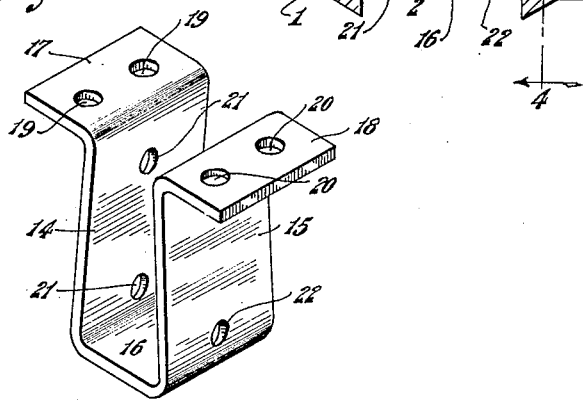
Fig. 2 is a detail of one of the inserted brackets for supporting the elastic filler pieces.

Referring to the drawings in detail:

1 designates the usual rim member that is located on the felly portion of the wheel. This member is formed with the usual channel part 2 and the outwardly extending or lateral flanges 3 and 4. 5 designates the layers of fabric of a pneumatic tire, 6 the tread portion of rubber that is vulcanized onto the fabric, in any well known way.

Located within the interior of the tire are three elastic or cushion supporting members for the tire which are preferably composed of rubber, as indicated by the reference numerals 7, 8, and 9. The elastic supporting members 7 are mounted or located on the channel-shaped members 10 having the side portions 11 and 12. 13 designates, as a whole, one of the bracket members, which is located within the tire and formed with the substantially parallel portions 14 and 15 and a connecting base portion 16, which rests directly on the metal rim 1, as shown.

Figure 3:
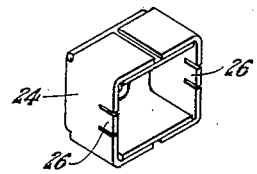
Fig. 3 is a detail perspective view of the clamp or stamping for attaching the lateral or side pieces of rubber to the interior supporting bracket member.

Integral with the ends of the parallel portions 14 and 15 are the laterally extending flanges 17 and 18. These flanges are formed with the openings 19 and 20 and the portions 14 and 15 with the openings 21 and 22. The openings 19 and 20 provide means for attaching the channel-shaped member 10 to the bracket member 13 by means of the rivets 23, and, the openings 21 and 22 provide for attaching the cup-shaped members 24, shown in Fig. 3, to the portions 14 and 15 by means of the rivet 25. The cup-shaped members 24 are preferably formed from a single stamping of sheet material, with the parts 26 bent inward, as shown in Fig. 1. These parts are for retaining the pieces of rubber 8 and 9 securely in place.

The bolts 27, which pass through the openings 21 and 22, also pass through the openings 28 and 29 in the lateral flanges 3 and 4 of the rim 1, for securing the brackets 13 to the rim 1. There are four of the channel and arc-shaped pieces 10. These pieces are secured together at their adjacent ends with the bolts 30, see Fig. 5, which are located in some of the flanges 17 and 18, as shown, that is to say, the flanges 17 and 18 of two of the brackets 13 are located between the bolts.

It will be seen that the present invention permits pneumatic tires, which have become worn, to be utilized again, after being reinforced by reason of the filler or interior supporting structure that is secured to the bracket member 13. The pieces of rubber 7 are practically continuous, one of which engages the inner surface 31 directly below the tread 6 and therefore acts as a cushion or elastic support for the tread. The opposite side walls of the tire are cushioned or elastically supported with the pieces of rubber 8 and 9 in the cup pieces, which are distributed, as shown in Fig. 4, around on the inner and opposite surfaces of the tire, as shown. The result is that a tire is provided which possesses the properties of a pneumatic tire having an inflated inner tube, and one that materially lessens the ultimate cost of tire expense, without substituting new tires.

By the term "carcass", it is to be understood that the term shoe is meant, as applied to the part of a pneumatic tire in which the inner tube is placed.

My invention, or improvement, is, as stated above, a filler construction, which is substituted for the inner tube. This filler may be removed as a unit by removing the bolts 27 and the shoe from the rim, when it is necessary to re-tread the shoe again.

It is to be understood that the elastic supporting members 7 are secured to the channel-shaped members 10, in any suitable way, as by vulcanizing the same to the members 10 for the purpose of preventing any creeping of these elastic supporting members, as such movement would necessarily injure these rubber supports.

What I claim is:

1. In pneumatic tires, means for maintaining substantially the contour of a pneumatic tire comprising filler members, engaging the inner surface of the tire and means for securing the filler member to the rim, said means comprising a plurality of brackets, channel members secured to the brackets and cup-shaped members, also secured to the brackets.

2. In pneumatic tires, means for maintaining substantially the contour of a pneumatic tire comprising filler members engaging the inner surface of the tire and means for securing the filler member to the rim, said means comprising a plurality of brackets, channel members secured to the brackets, cup-shaped members also secured to the brackets, and elastic material in the channel and cup-shaped members.

3. In combination with a pneumatic tire having the inner tube removed, a filler within the tire comprising a plurality of channel-shaped members, elastic material in said members, brackets to which the channel-shaped members are secured, cup-shaped members secured to the brackets, elastic material in the cup-shaped members and means for securing the brackets to the tire rim.

4. A support or filler for the shoe of a pneumatic tire comprising a bracket formed with arms or side portions and having flanges on the arms, a channel-shaped member secured to the flanges, elastic material in the channel-shaped member, and means secured to the arms for attaching elastic material thereto for engaging the inner and opposite side surfaces of the shoe, the bracket having means for securing the same to a tire rim.

5. A removable filler for a pneumatic shoe comprising bracket members with substantially parallel sides, channel-shaped members secured to the bracket members, elastic material in the channel-shaped members, means for securing the channel-shaped members to the brackets, cup-shaped members secured to the parallel sides, elastic material in the cup-shaped members and means for securing the brackets to the tire rim.

EUGENE E. REDDEN.